(12) United States Patent
Deutschmann et al.

(10) Patent No.: US 11,706,477 B2
(45) Date of Patent: Jul. 18, 2023

(54) SYSTEM FOR REAL-TIME SYNCHRONIZATION

(71) Applicant: MYSYNCSTER HOLDING OÜ, Tallinn (EE)

(72) Inventors: Oliver Deutschmann, Potsdam (DE); Karl Deutschmann, Potsdam (DE); Hubert Wilczynski, Wroclaw (PL); Frederik Johannssen, Tallinn (EE)

(73) Assignee: MYSYNCSTER HOLDING OÜ, Tallinn (EE)

( * ) Notice: Subject to any disclaimer, the term of this patent is extended or adjusted under 35 U.S.C. 154(b) by 0 days.

(21) Appl. No.: 16/960,487

(22) PCT Filed: Dec. 21, 2018

(86) PCT No.: PCT/EP2018/086580
§ 371 (c)(1),
(2) Date: Jul. 7, 2020

(87) PCT Pub. No.: WO2019/134859
PCT Pub. Date: Jul. 11, 2019

(65) Prior Publication Data
US 2021/0067827 A1    Mar. 4, 2021

(30) Foreign Application Priority Data
Jan. 8, 2018 (EP) .................................... 18150577

(51) Int. Cl.
*H04N 21/43* (2011.01)
(52) U.S. Cl.
CPC .............. *H04N 21/4302* (2013.01)
(58) Field of Classification Search
CPC ................................................ H04N 21/4302
See application file for complete search history.

(56) References Cited

U.S. PATENT DOCUMENTS

| 2003/0126211 A1 | 7/2003 | Anttila et al. |
| 2008/0209075 A1 | 8/2008 | Shamma |

(Continued)

FOREIGN PATENT DOCUMENTS

| CN | 1650278 A | 8/2005 |
| CN | 103839558 A | 6/2014 |

(Continued)

OTHER PUBLICATIONS

International Search Report and Written Opinion issued in International Application No. PCT/EP2018/086580 dated Apr. 3, 2019 (10 pages).

(Continued)

*Primary Examiner* — Adil Ocak
(74) *Attorney, Agent, or Firm* — Bookoff McAndrews, PLLC (57) ABSTRACT

The invention relates to a system and a corresponding method for sharing multi-media content among a plurality of users. The invention further relates the corresponding devices and a corresponding computer program for conducting the sharing of multi-media content. The system comprises a first device comprising means for generating an invitation and a play time stamp and the system further comprises means for transmitting the play time stamp and the invitation to at least one second device. The system also comprises a third device that may generate a system time and distribute the system time. The at least one second device may play multi-media content synchronous to playback of the same multi-media content at the first device.

15 Claims, 3 Drawing Sheets

(56) References Cited

U.S. PATENT DOCUMENTS

| | | | | |
|---|---|---|---|---|
| 2009/0160731 | A1* | 6/2009 | Schuler | G06F 3/1423 |
| | | | | 345/1.1 |
| 2011/0196918 | A1* | 8/2011 | Kkunigita | H04N 21/242 |
| | | | | 709/203 |
| 2012/0042047 | A1 | 2/2012 | Chen et al. | |
| 2015/0128195 | A1* | 5/2015 | Kunigita | H04N 21/4307 |
| | | | | 725/82 |
| 2016/0035016 | A1* | 2/2016 | Spio | G06Q 50/01 |
| | | | | 705/27.2 |
| 2016/0057173 | A1 | 2/2016 | Singman et al. | |
| 2017/0019394 | A1* | 1/2017 | Yastrebenetsky | H04L 63/083 |
| 2018/0014077 | A1* | 1/2018 | Hou | H04N 21/25841 |
| 2018/0359508 | A1* | 12/2018 | Lindgren | H04N 21/4302 |

FOREIGN PATENT DOCUMENTS

| | | |
|---|---|---|
| CN | 104159139 A | 11/2014 |
| CN | 106303590 A | 1/2017 |
| CN | 106412665 A | 2/2017 |
| CN | 106488290 A | 3/2017 |
| EP | 1940111 A2 | 7/2008 |
| EP | 2670157 A2 | 12/2013 |
| JP | 2011035503 A | 2/2011 |
| WO | 2012018300 A2 | 2/2012 |

OTHER PUBLICATIONS

Office Action issued in Chinese Application No. 201880085846.6 dated Jan. 28, 2022 (13 pages) (English Translation attached).

Office Action issued in Chinese Application No. 201880085846.6 dated Oct. 8, 2022 (English language translation) (11 pages).

Office Action issued in Japanese Application No. 2020-557385 dispatched Jan. 24, 2023 (English translation) (6 pages).

* cited by examiner

SYSTEM FOR REAL-TIME SYNCHRONIZATION

The invention relates to a system for sharing multi-media content among a plurality of users. The invention further relates to a corresponding method for sharing multi-media content and to the particular devices of the system configured to share the multi-media content.

In the past decade application of social media platforms has vastly increased. Social media platforms allow a large number of users to interact by e.g. sharing notifications, sounds, pictures or movies. Usually the content to be shared is uploaded to a server that allows access to other users mostly depending on an authorization function. The authorized users may copy, steam or download content from the server.

Furthermore, some social media platforms implement functions allowing users to directly interact with each other e.g. any kind of messenger or chatting programs. In such a program a user may send multi-media content to other user's devices that can play the shared multi-media content.

Moreover, WO2012/018300 discloses a first User Terminal, UT, and a method performed by a first User Terminal, UT, for synchronizing playback of media streams is provided. The UT selects a media stream to be played synchronously by the first UT and at least one second UT. The first UT provides an indicator associated with the selected media stream and an indicator of the at least one second UT to a coordination server. The first UT requests the selected media stream from streaming storage and buffers the received data being associated with the selected media stream. The first UT then receives synchronization instructions from the coordination server and thereafter initiates playback of the media stream based on the received synchronization instructions, and thereby enabling the first UTs to, with respect to the at least one second UT, synchronously playback the media stream.

However in any case the data to be shared need to be transferred either from the main user device to the server and from the server to other user devices or directly between the devices. Hence, sharing multi-media content is cumbersome and involves several steps of interaction until the other users may play the multi-media content.

It is an object of the invention to provide a system integrating a plurality of devices and a corresponding method that may be carried out by a computer program to improve and simplify the sharing of multi-media content among users.

According to a first aspect of the invention, it is provided a system comprising a first device, at least one second device and a third device, wherein the first device comprises means for generating an invitation comprising a specification of the multi-media content for playback and a play time stamp defining the playback time of the multi-media content; and transmitting the invitation along with the play time stamp to the at least one second device the third device comprises means for generating a system time and distributing the system time to the at least one second device and/or the first device the at least one second device comprises means for receiving the invitation and the play time stamp, and receiving the system time from the third device, and playing the multi-media content synchronously with the first device when the play time stamp matches to the system time.

This invention provides a system that allows users to efficiently and quickly interact. Moreover, the system allows a user to invite other users to play the same multi-media content synchronously. In this context multi-media content comprise audio, video or any communication medium. The synchronous playback allows users to share own emotions with others such that all users experience their emotions to the respective multi-media content at the same time. For example a user may listen to music and while listening the user may invite friends to listen to the same piece of music and at the same time share feelings. Also, some of the invited users may influence the playback by themselves and thereby share own components in the community of listeners.

The synchronous playback is enabled by generating and exchanging a play time stamp. In this context a play time stamp in the common sense defines a certain position in the multi-media content with respect to a reference time.

The reference time may be the system time that may serve as a reference for the playback at the devices in the system.

Further, in this context a device may be any kind intelligent device, such as a smartphone, computer, radio, tv. Also, the devices may be permuted, i.e., each device may serve as first, second and third device. A first device may also serve as a second device or as a third device. The same applies vice versa. Hence, a device does not necessarily need means to play the multi media content as it also may only distribute and generate a system time.

According to a preferred embodiment, the first device comprises means for transmitting the play time stamp to the at least one second device directly and/or via the third device.

This embodiment defines to send the play time stamp to the at least one second device on a direct path which reduces the waiting time of the at least one second device to receive the play time stamp. Furthermore, it may be favourable that the play time stamp may be sent from the first device to the third device and from the third device to the at least one client device. Thereby the play time stamp may or may not be stored at the third device. This allows bundling of several play time stamps and reducing transmission latencies of signals. A signal in this meaning may be any kind of electromagnetic impulses, in particular the invitation, play time stamp, the transmission of the system time or other times, that are exchanged among the devices. Also it may be favourable to include a third device to which each of the at least one second devices may gain access as it might not be possible for some devices to directly connect to the first device.

According to another preferred embodiment, the first device comprises means for transmitting the invitation to the at least one second device directly and/or via the third device.

An invitation may be any kind of electronic signal that invites a user to join play-back. This embodiment has the advantage, that the invitation may be sent directly from the first to at least one second device, which reduces the waiting time to receive the invention and enhances a "I-just-start-to-listen-to-music-and-invite-others" effect. In some cases it may be also be favourable to sent the one or more invitations from the first device to the third device, where the one or more invitations may optionally be saved, and sending the one or more invitation to the at least one second device. At the third device the one or more invitations may be bundled and sent at the same time.

According to another preferred embodiment, the first device comprises means for transmitting a time of the first device to the third device and wherein the third device comprises means for generating the system time on the basis of the time of the first device.

This preferred embodiment defines that the system time may be based on the time of the first device. This has the advantage that the time system in which the play-back is initially started determines the time of all devices in the system.

According to a further preferred embodiment, the third device comprises means for transmitting the system time to the first device and wherein the first device comprises means for, upon receipt of the system time, generating the play time stamp on the basis of the system time.

This preferred embodiment defines that the play time stamp generated at the first device may be directly based on the system time. The system time is to be shared by all devices in the system. Therefore, if the playback time is generated based on the system time and then sent either directly to the at least one second device or via the third device, the at least one second device may instantly start playback without the waiting for the system time to be generated.

According to another preferred embodiment, the invitation contains information identifying the multi-media content, the information comprising predetermined information on data packages of the multimedia content in least one consecutive time interval and/or meta-data of the multi-media content.

This preferred embodiment defines that the information identifying the multi-media content may be sent with the invitation. In order to play the multi-media content the at least one second device may use these information. Sending the information either in the invitation or with the invitation provides an efficient way of transmission, which reduces the number of signals sent.

Furthermore, the multi-media content identification may be conducted via meta-data. Those meta-data in this context are common information that specify the multi-media content (e.g. artist, title, publication date). As those data are commonly shared they are easy to obtain and accessible to a large number of users. Moreover, the identification may also be done on the basis of predetermined information on data packages of the multi-media content in at least one consecutive time interval. These information are suitable for application of a file matching approach as discussed further below.

According to another preferred embodiment, the predetermined information on data packages comprise package bitsizes and/or a package time interval and/or package bitsizes in a predetermined timing interval and/or a file format and/or a content specific pattern of the predetermined timing intervals and package bitsizes.

The predetermined information may be used to apply the file matching approach. The file matching approach uses the size of following data packages individual to the multi-media content for identification. The sizes of several following data packages in predefines timing intervals may form individual fingerprints. These timing intervals may have a width of several microseconds to several seconds. The pattern and distance of the fingerprints may be scanned and matched with those of multi-media content stored in an external or internal storage system or in a database, wherein the distance between the fingerprints may range form several microseconds to several seconds. Further, the pattern of the fingerprints may also be converted into a hash pattern. The file matching approach allows efficient and reliable matching the multi-media content. It may also be applied for synchronization of playback at the devices.

According to another preferred embodiment, the at least one second device comprises means for gaining access to the multi-media content in accordance with the predetermined information and/or the meta-data of the multi-media content.

In this preferred embodiment, the at least one second device may gain access to the multi-media content independently via matching of the meta-data and/or via the file matching approach. This may for example be to download, stream, copy or via any other common transaction the multi-media content from a local hard drive, internet based applications, databases or any other common platform to obtain multi-media content. Therefore, there is no need to transfer the multi-media content from the first device to the at least one second device or via the third device. This has several advantages, such as the amount of data is reduced, security is increased and waiting time is reduced.

According to another preferred embodiment, the play time stamp contains information on the start or change of playback and/or a time delay with respect to a time at the first device and/or relation to system time shared by participating devices.

The play time stamp may define the position of the multi-media content playback with respect to a reference time. In this context the position may be a frame, a time or any other striking unit in the playback. With this information the start of playback time is defined at each device. The playback of the multi-media content may start from the position defined by play time stamp with reference the system time. This allows the at least one second device and the first device to start playback synchronous to the first device. Further, a delay time, e.g. resulting from the signal transmission time and/or a user response time, may be calculated into the play time stamp such that the playback will start any time in the future after the generation of the play time stamp.

According to another preferred embodiment the at least one second device comprises means for continuously synchronizing the play time stamp of the multi-media content with the first device and/or via the third device, in particular in accordance with the predetermined information and/or in accordance with a specific time stamp.

Each time the playback is changed, a new play time stamp may be generated at the device that changes (e.g. pause, halt, fasten) the playback. This may be done by the first device but also by each of the one or more client devices. Via continuous synchronization of the play time stamp changes of playback may almost immediately be implemented at the at least ones second device. Thereby synchronization rates may range from the microsecond range up to several seconds. With the changed play time stamp those devices that have not generated a new play time stamp may start playback from the position newly defined by the new play time stamp and thereby follow the respective generating device. Actually, it should be enough if the first device just provides play time stamp (time moment in file) and system time at the moment of play time stamp and by that everyone should be able to calculate current play time stamp in future just by counting difference between current system time and system time at the moment of generating play time stamp.

According to another preferred embodiment, the at least one second device comprises means for adjusting a time latency with respect to the system time of the third device and/or the first device, in particular via continuous synchronization and/or via sending a ping signal.

This is preferred embodiment assures in one aspect that timing delays during signal transmission may be taken into account in the system time at the respective devices. This may also assure that the playback at the devices is exactly synchronous and not shifted due to signal transmission latencies. Therefore, the at least one second device may measure signal transmission times to first and third devices separately via a ping signal and correspondingly adjust the respective system time.

According to another preferred embodiment, the third device comprises means for sending a ping signal to the at least one second device and/or the first device, the third device further comprising means for adjusting the system time in accordance with the time latency between the at least one second device, the first device and the third device.

This preferred embodiment has the advantage that the playback at the first and at least one device is synchronous and may not be affected by signal transmission latencies. Therefore, the transmission time may be determined via a ping signal that may be sent from the third device. The individual transmission times to the at least one second device and/or the first device may be calculated as a correction factor into the respective system times.

DETAILED DESCRIPTION OF EMBODIMENTS

The illustration in the drawings is schematical. In different drawings similar or identical elements are provided with the same reference numerals.

Embodiment 1

Figure 1:
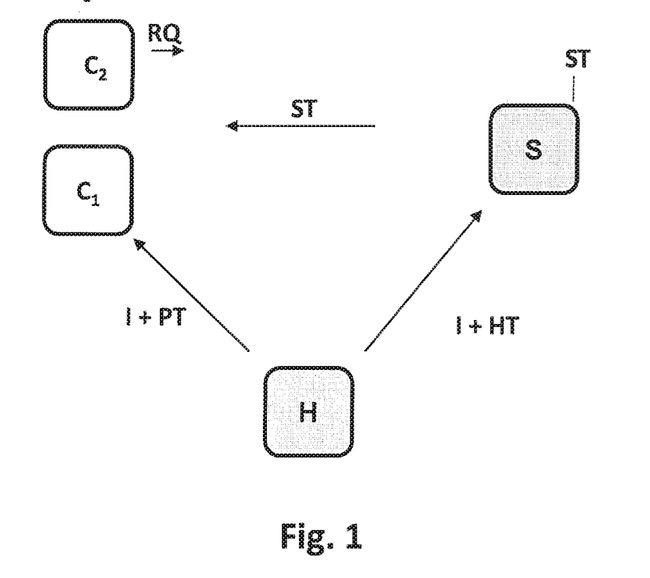
FIG. 1 schematically illustrates a system for real time synchronization according to one embodiment.

FIG. 1 illustrates an exemplary system for real time synchronization according to one embodiment. The system comprises at least three devices. A first one of the devices may be a host device (H), a second one or more of the devices may be client devices ($C_1, C_2 \ldots$) and a third one of the devices may be a server device (S). All devices in the meaning of this application may be equal. A device may means for transmission and reception and storage of multi-media content. Devices in the meaning of this application may for example be mobile phones, personal computers or tablets. Means for playback is favourable but not an essentiality as for example device that may act as a server device does not necessarily need to play the multi-media content.

The devices may communicate and signals may be transmitted by any kind of wireless or cable bound telecommunication such as internet, cellular or satellite networks, Bluetooth, NFC, Radio. Also, it is to be understood that when several signals are sent from one device, those signals may be send combined or individually.

A user who wants enjoy playback of multi-media content e.g. a song or a music video, may also want to share emotions with other users such that they experience emotions simultaneously. While playing the multi-media content using a device that may act as a host device (H), the user may invite other users with client devices ($C_1, C_2 \ldots$) to enjoy the multi-media content simultaneously. Thus, the host device (H) of the user may generate an invitation (I) to invite other users.

The invitation (I) may comprise information specifying the multi-media content. Those might for example be meta-data such as a title, an artist or a predetermined indication number. Furthermore, the invitation may contain information on the file structure of the multi-media content that allow file matching procedure as will be described below.

The host device (H) may further generate a play time stamp in accordance with the playback of multi-media content by the host device. The play time stamp may be any kind of time stamp that is assigned to a time interval or data packages of the multi-media content as for example a presentation time stamp (PTS) and may refer to a reference time (e.g. a system time (ST) or a host time (HT)).

Hence, the play time stamp (PT) defines the playback time of the multi-media content with respect to the reference time.

The host device (H) may send the invitation (I) along with the play time stamp (PT) to the one or more client devices ($C_1, C_2 \ldots$) and along with the host time (HT) to the server device (S). Upon receipt of the host time (HT), the server device (S) may generate a system time (ST) on the basis of the host time and distribute the system time (ST) to the at least one client device ($C_1, C_2 \ldots$) and optionally to the host device (H).

Having received the invitation (I) and the play time stamp (PL), the one or more client devices ($C_1, C_2 \ldots$) gain access (e.g. download, copy, stream) to the multi-media content on the basis of the information sent via the invitation (I). This may be done via matching the meta-data with those of multi-media content stored in a data base or via matching the content specific file structure of the multi-media content via file matching (see below). Gaining access to the multi-media content may be independent from the host device (H), i.e., the multi-media content itself does not need to be transferred to the one or more client devices ($C_1, C_2 \ldots$), which reduces the transmitted data volume and response waiting time.

Additionally, but not necessarily, the one or more client devices ($C_1, C_2 \ldots$), upon acceptance of the invitation (I) and the play time stamp (PL), may also send a timing request (RQ) to the server device that may distribute the system time (ST) to the one ore more client devices ($C_1, C_2 \ldots$) upon receipt of the timing request (RQ).

Optionally, the one or more client devices ($C_1, C_2 \ldots$) or the server device (H) may calculate a individual time latency into the system time (ST). The time latency may be measured via a ping signal measuring a time delay of the signal transmission. Furthermore, also the availability of the one or more client devices ($C_1, C_2 \ldots$) and/or the server device (H) may be verified via the ping signal. The ping signal is sent or received from each of the one or more client devices ($C_1, C_2 \ldots$) and/or from the server device (S) and/or the host device (H).

Figure 2:
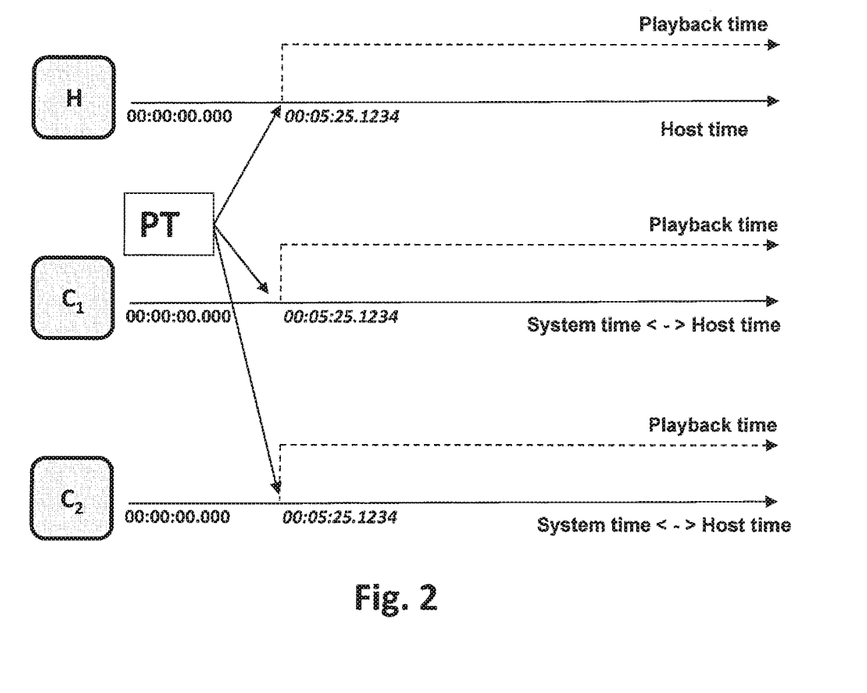
FIG. 2 schematically illustrates synchronous playback at the host and the client devices.

Having received the system time (ST) and the play time stamp (PL), the one or more client devices ($C_1, C_2 \ldots$) may start playing the multi-media content staring from the respective data time interval or data packages that is specified by the play time stamp, when the play time stamp matches corresponding reference time. This is schematically illustrated in FIG. 2.

The play time stamp (PT) may be continuously synchronized among the host (H) and the one ore more client devices ($C_1, C_2 \ldots$). The host device (H) may serve as a controller of the playback by the client devices ($C_1, C_2 \ldots$). If, for example, at the host device (H) playback is paused, fastened or repeated the play time stamp (PT) will be modified with respect to the system time. As the play-time stamps (PT) at the one or more client devices ($C_1$, $C_2$ . . . ) may likewise be synchronized the playback of the multi-media content follows the playback at the host device.

In this way, the same multi-media content is played synchronously at the host (HT) and the client device ($C_1$, $C_2$ . . . ). Thus, a plurality of users may enjoy the same content at the same time and share the same emotions.

It is to be understood that there may be no difference between the client devices (C) and the host device (H). Thus, each client device (C) may serve as a host device (H) and each host device (H) may serve as a client device (C). Thus, also a client device (C) may affect the playback at the host device (H) and/or others of the one or more client devices ($C_1$, $C_2$ . . . ), e.g. fasten, pause or stop the playback.

File Matching

In order to reliably identify multi-media content files, an approach is provided that compares data packages in a defined time and size scope. This approach may be called in this context the file matching approach and is illustrated in FIGS. 3 and 4.

Figure 3:
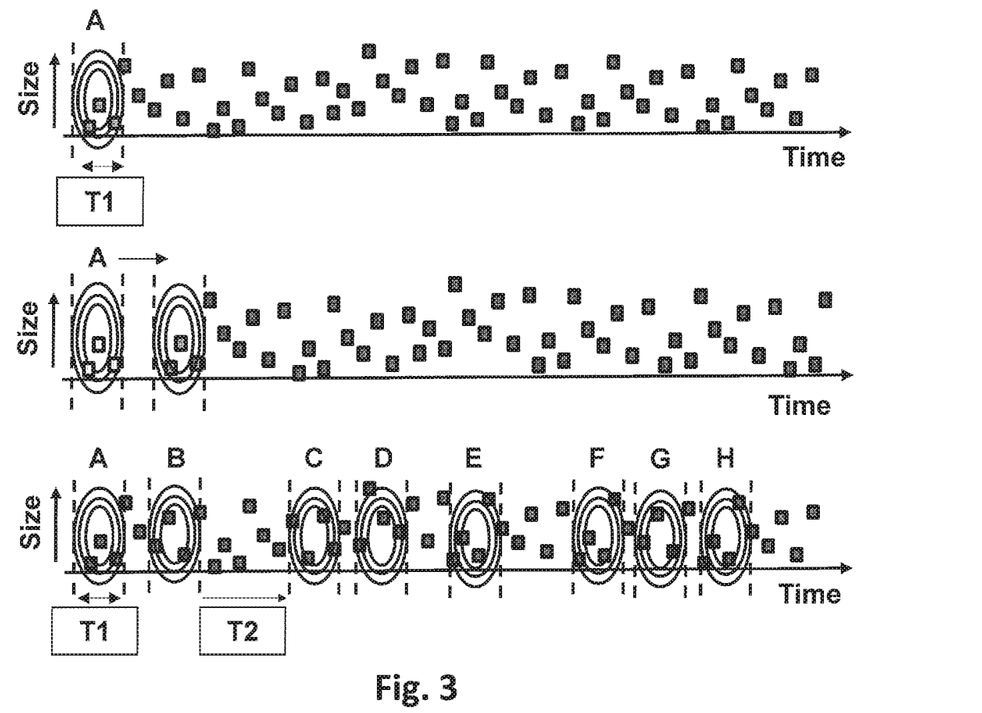
FIG. 3 schematically illustrates file identification via file matching.

The position of single data packages (1) within a time and size grid generates a specific pattern, exemplary shown in FIG. 3. The pattern may be divided into several time windows which are designated as fingerprints. A first fingerprint (A) is schematically indicated. A fingerprint may comprise a time resolution with a widow (T1) of about 2 ms and comprise several data-packages (1) such as e.g. a frame. The order of the data packages and, hence, the fingerprints on a time scale is characteristic to the multi-media content.

The first fingerprint (A) on the timeline of the multi-media content defines a starting point. By scanning the multi-media content files for such fingerprint, the same file may be found in the data base. A matching o the data structure to the first fingerprint (A) is an indication for the identical file. Wherein several fingerprints and a related countercheck leads to a more accurate result. Hereby, there the interval (T2) between the individual fingerprints is another identifier for identical files. Means not only the fingerprints may match but also the order and arrangement of the fingerprints in time.

Figure 4:
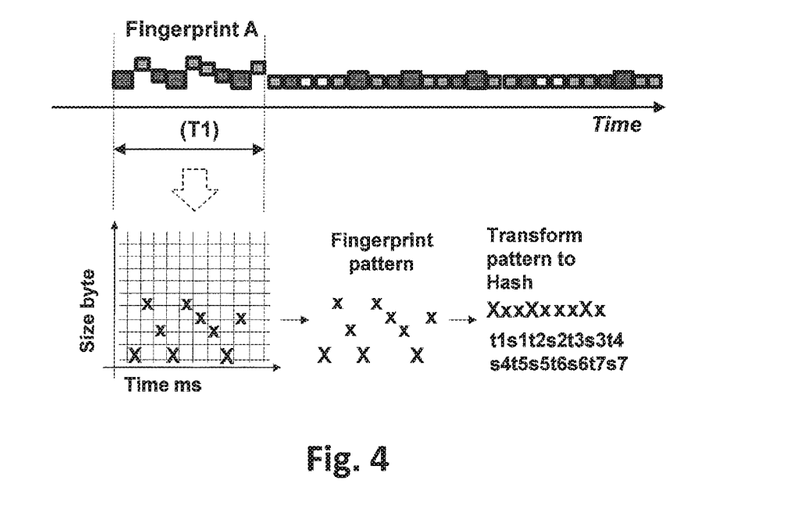
FIG. 4 schematically illustrates a transformation of the file matching system into a hash pattern.

In practice as shown in FIG. 4, a first file may be scanned for its first significant pattern and the scanned fingerprints may be transformed into a hash pattern. Scanning a first fingerprint may be done by scanning a time window of e.g. 2 ms for the size of the data packages in this time window. The data packages at a specific time may then be transformed into a hash pattern. In the following a second fingerprint in a preceding interval may be scanned in the same way and my form a second hash pattern. The same may be done equally with a second or more files.

If the hash patterns for the first fingerprint, the second fingerprint or even more fingerprints as well as their spacing matches with the fingerprints and the spacing of a second file a match is found.

The time interval between the fingerprints can be set in diverse ways, e.g. in equal intervals, randomly over the timeline of the data structure or related to somehow significant patterns.

This could lead to a subordinate hash code (fingerprints and their related interval) and a subordinate hash code describing the specific pattern of a fingerprint. A merging of both hash codes may deliver a final hash code.

Those hash codes may be further be stored in a data base.

Embodiment 2

Figure 5:
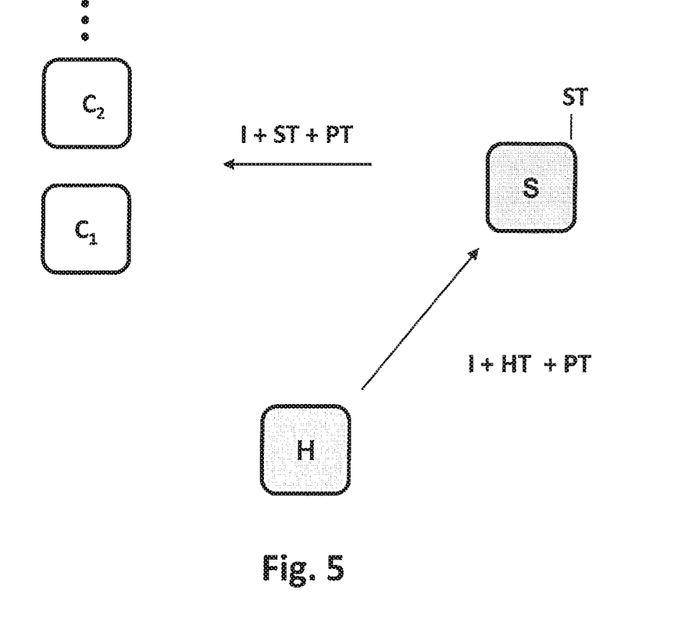
FIG. 5 schematically illustrates a system for real time synchronization according to a second embodiment.

FIG. 5 illustrates an exemplary system for real time synchronization according to a second embodiment. The second embodiment is in substances equal to the first embodiment, the distinguishing features will be described herein below.

The system of the second embodiment comprises at least three devices. A first one of the devices may be a host device (H), a second one or more of the devices may be client devices ($C_1$, $C_2$ . . . ) and a third one of the devices may be a host device (H).

The host device may generate the invitation (I) and the play time stamp (PT). The parameters are same to the first embodiment. However, in the second embodiment, the host device (H) sends the invitation (I) along with the play time stamp (PT) and the host time (H) to the server device (S).

The server device generates a system time (ST) on the basis of the host time (HT). The server device (S) further sends the invitation (I) along with play time stamp (PT) and the system time (ST) to the at least one client device ($C_1$, $C_2$ . . . ). The server device (S) may optionally send the system time (ST) to the host device (HT).

Upon receipt of the invitation (I), the system time (ST) and the play time stamp (PT), the at least one client device ($C_1$, $C_2$ . . . ) may play the multi-media content synchronous to the playback at the host device (H).

Furthermore, the server device (H) may comprise means to store the play time stamp (PT), the system time (ST), the host time (HT) and the invitation (I). The play time stamp (PT), the system time (ST), the host time (HT) and the invitation (I) may be continuously synchronized between the host device (H), the server device (S) and the at least one client device ($C_1$, $C_2$ . . . ).

Embodiment 3

Figure 6:
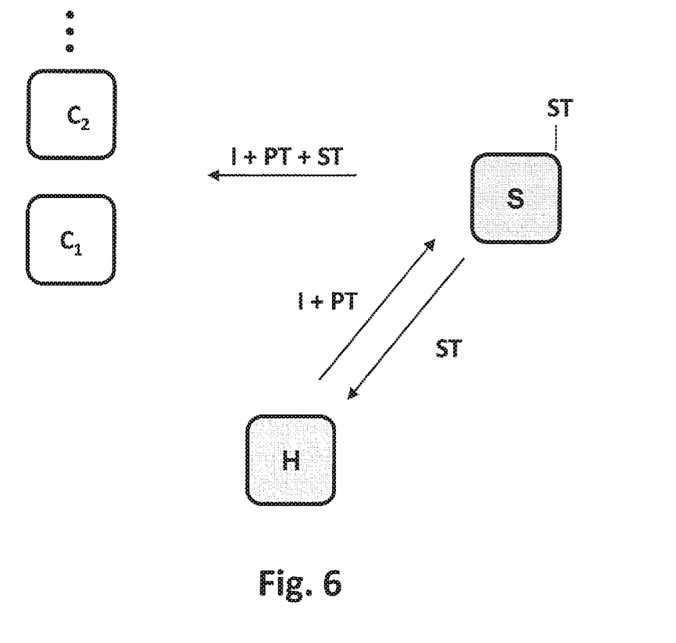
FIG. 6 schematically illustrates a system for real time synchronization according to a third embodiment.

FIG. 6 illustrates an exemplary system for real time synchronization according to a second embodiment. The second embodiment is in substances equal to the first embodiment, the distinguishing features will be described herein below:

The server device (S) generates the system time (ST) and distributes the system time (ST) to host device (H). Upon receipt of the system time (ST), the host device (H) generates the play time stamp (PT) on the basis of the system time (ST). The host device (H) further generates the invitation (I) and sends the invitation (I) along with the play time stamp (PT) to the server device (S).

Upon receipt of the invitation (I) and the play time stamp (PT), the server device (S) may distribute the invitation (I) along with the play time stamp (PT) and the system time (ST) to the at least one client devices ($C_1$, $C_2$ . . . ). The at least one client device ($C_1$, $C_2$ . . . ) may play the multi-media content synchronous to the playback host device as described in the first embodiment.

In further embodiments it may be understood that all kinds of constellations of transmitting and sharing the play time stamp (PT), the invitation (I) and the system time (St) to and among the devices may be possible, such as transmitting the invitation (I) to the one ore more client devices ($C_1$, $C_2$ . . . ) directly and sending the play time stamp (PT) and the system time (ST) via the server device (S).

The invention claimed is:

1. A system for real-time playback synchronization of multi-media content comprising a host device (H), at least one client device ($C_1$, $C_2$), and a server device (S), wherein the real-time playback synchronization is performed by:

the host device (H) being configured to:
    generate an invitation (I) comprising information identifying the multi-media content for playback and a play time stamp (PT) in accordance with the playback of the multi-media content by the host device (H), the play time stamp (PT) defining a position of the multi-media content with respect to a reference time, the reference time being a system time (ST) serving as a reference for playback in the system, the play time stamp (PT) specifying a data package of the multi-media content, and the information identifying the multi-media content specifying a content specific pattern of sizes of data packages in predefined successive time intervals of a file of the content, and a first data package defining a starting point of the multi-media content; and transmit the invitation (I) and the play time stamp (PT) to the at least one client device ($C_1$, $C_2$);

the server device (S) being configured to:

generate the system time (ST); and distribute the system time (ST) to the at least one client device ($C_1$, $C_2$) and the host device (H); and the at least one client device ($C_1$, $C_2$) being configured to:

receive the invitation (I) and the play time stamp (PT) from the host device (H);

receive the system time (ST) from the server device (S);

match the content specific pattern specified in the information identifying the multi-media content, which is included in the invitation (I), with patterns of multi-media content stored in a database to identify the multi-media content to be played back; and play the identified multi-media content synchronously with the host device (H) from the position defined by the play time stamp when the play time stamp (PT) matches to the system time (ST).

2. The system according to claim 1, wherein the host device (H) is further configured to transmit the play time stamp (PT) to the at least one client device ($C_1$, $C_2$) directly and/or via the server device (S).

3. The system according to claim 1, wherein the host device (H) is further configured to transmit the invitation (I) to the at least one client device ($C_1$, $C_2$) directly and/or via the server device (S).

4. The system according to claim 1, wherein the host device (H) is further configured to transmit a time of the host device (H) to the server device (S); and wherein the server device (S) is configured to generate the system time (ST) on the basis of the time of the host device (H).

5. The system according to claim 1, wherein the server device (S) is configured to transmit the system time (ST) to the host device (H); and wherein the host device (H) is configured to, upon receipt of the system time (ST), generate the play time stamp (PT) on the basis of the system time (ST).

6. The system according to claim 1, wherein the information identifying the multi-media content comprises predetermined information on the data packages of the multi-media content in least one consecutive time interval and/or meta-data of the multi-media content.

7. The system according to claim 6, wherein the predetermined information on the data packages comprises a package bitsize and/or a package interval.

8. The system according to claim 6, wherein the at least one client device ($C_1$, $C_2$) is configured to gain access to the multi-media content in accordance with the predetermined information and/or the meta-data of the multi-media content.

9. The system according to claim 1, wherein the play time stamp (PT) contains information on a start or a change of playback and/or a time delay with respect to a time at the host device (H) and/or relating to the system time (ST) shared by participating devices.

10. The system according to claim 1, wherein the at least one client device ($C_1$, $C_2$) is further configured to continuously synchronize the play time stamp (PT) of the multi-media content with the host device (H) and/or via the server device, in accordance with predetermined information and/or in accordance with a specific time stamp (PT).

11. The system according to claim 1, wherein the at least one client device ($C_1$, $C_2$) is configured to adjust a time latency with respect to the system time (ST) of the server device (S) and/or the host device, via continuous synchronization and/or via sending a ping signal.

12. The system according to claim 1, wherein the server device (S) is configured to send a ping signal to the at least one client device ($C_1$, $C_2$) and/or the host device; and wherein the server device (S) is further configured to adjust the system time (ST) in accordance with a time latency between the at least one client device ($C_1$, $C_2$), the host device (H), and the server device.

13. The system according to claim 1, wherein the at least one client device ($C_1$, $C_2$) is configured to affect the playback of the multi-media content by fastening the playback, pausing the playback, stopping the playback, or moving to any place in a playback timeline.

14. A method for real-time playback synchronization of multi-media content, the method comprising the steps of:

at a host device (H):

generating an invitation (I), the invitation comprising information identifying the multi-media content for playback and a play time stamp (PT) in accordance with the playback of the multi-media content by the host device (H), the play time stamp (PT) defining a position of the multi-media content with respect to a reference time, the reference time being a system time (ST) serving as a reference for playback in the system, the play time stamp (PT) specifying a data package of the multi-media content, and the information identifying the multi-media content specifying a content specific pattern of sizes of data packages in predefined successive time intervals of a file of the content, and a first data package defining a starting point of the multi-media content; and transmitting the invitation (I) and the play time stamp (PT) to at least one client device ($C_1$, $C_2$);

at a server device (S):

generating the system time (ST); and distributing the system time (ST) to the at least one client device ($C_1$, $C_2$) and/or the host device (H);

at the at least one client device ($C_1$, $C_2$):

receiving the invitation (I) and the play time stamp (PT) from the host device (H);

receiving the system time (ST) from the server device (S);

matching the content specific pattern specified in the information identifying the multi-media content, which is included in the invitation (I), with patterns of multi-media content stored in a database to identify the multi-media content to be played back; and playing the identified multi-media content synchronously with the host device (H) from the position defined by the play time stamp when the play time stamp (PT) matches the system time (ST).

15. A computer program for real time synchronization of multi-media content, when executed on a host device (H), at least one client device ($C_1$, $C_2$), and a server device (S), performing the steps of:

at the host device (H):
      generating an invitation (I), the invitation comprising information identifying the multi-media content for playback and a play time stamp (PT) in accordance with the playback of the multi-media content by the host device (H),
      the play time stamp (PT) defining a position of the multi-media content with respect to a reference time, the reference time being a system time (ST) serving as a reference for playback in the system,
      the play time stamp (PT) specifying a data package of the multi-media content, and
      the information identifying the multi-media content specifying a content specific pattern of sizes of data packages in predefined successive time intervals of a file of the content, and a first data package defining a starting point of the multi-media content; and
      transmitting the invitation (I) and the play time stamp (PT) to the at least one client device ($C_1$, $C_2$);
   at the server device (S):
      generating the system time (ST); and
      distributing the system time (ST) to the at least one client device ($C_1$, $C_2$) and/or the host device (H); and
   at the at least one client device ($C_1$, $C_2$):
      receiving the invitation (I) and the play time stamp (PT) from the host device (H);
      receiving the system time (ST) from the server device (S);
      matching the content specific pattern specified in the information identifying the multi-media content, which is included in the invitation (I), with patterns of multi-media content stored in a database to identify the multi-media content to be played back; and
      playing the identified multi-media content synchronously with the host device (H) from the position defined by the play time stamp when the play time stamp (PT) matches the system time (ST).

* * * * *